3,293,488
**LOW INDUCTANCE CAPACITOR AND
SWITCHING ASSEMBLY**
Robert S. Dike and Edwin L. Kemp, Los Alamos,
N. Mex., assignors to the United States of America as
represented by the United States Atomic Energy Commission
Filed Apr. 8, 1963, Ser. No. 271,529
3 Claims. (Cl. 315—59)

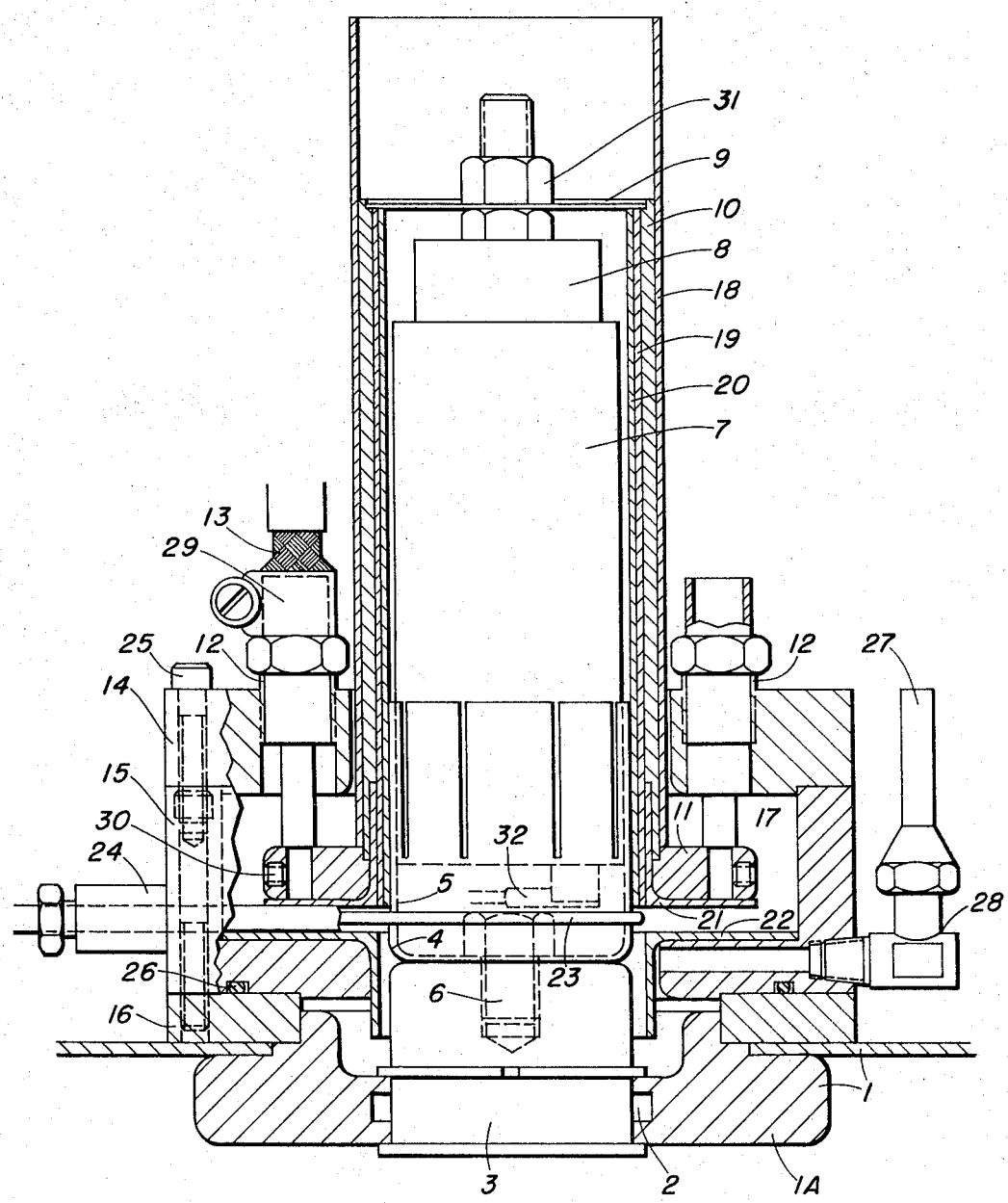

Many plasma physics experiments require the use of fast-rising magnetic fields. The rise time of these fields is determined by the circuit inductance and the capacity of the energy storage bank. In ultra-low inductance systems, the rise time of the circuit current is a direct function of the capacitor and switch inductance. This specification describes one means for obtaining a very low inductance capacitor and switch assembly.

In prior designs the mating of an ignitron and a capacitor utilized air as the insulating component between points of varying charge resulting in large spacing and consequently, large inductances. The capacitor center electrode diameter was very small and the distance between the electrode and the ground return ring was large. In addition, a very large parasitic inductance was found at the output cable as a result of the large amount of skin-back on the load cables.

The present invention is a low inductance capacitor and switch assembly comprising a capacitor, a centrally-located electrode at the top of said capacitor, an ignitron mounted on said electrode, said electrode and at least a part of said ignitron being immersed in oil, the anode potential of said ignitron following a path through the ignitron housing and oil to a plurality of load cables.

It is an object of this invention to provide a capacitor-switch geometry having a very low inductance.

It is a further object of this invention to provide a capacitor-ignitron assembly utilizing insulating oil as the dielectric medium.

The manner in which these objectives are obtained, and other objectives and advantages flowing from this invention will become apparent from the following description.

The drawing is a diagrammatic cross section of the device in accordance with this invention.

Referring to the drawing, a capacitor header 1 is mounted on a conventional industrial energy storage capacitor. This header contains an epoxy capacitor insulator 1A. Seals 2 are provided between the insulator 1A and the capacitor center electrode 3 to avoid the leakage of oil into the capacitor body. A cup 4 is mounted and secured on top of the capacitor center electrode 3. This cup serves as a clamp socket for an ignitron 5. Screw 6 secures the ignitron and cup to the capacitor center electrode. Following the path of charge through the device, the charge flows through capacitor center electrode 3 to the cathode portion 7 of ignitron 5. The charge from anode 8 flows through flexible mount 9 down a folded return 10 of the ignitron housing. Thus, the anode potential is taken back down the outside of the ignitron to flange 11. The charge is taken from this flange through the center conductor of a coaxial cable through pipe adapters 12. Set screws 30 maintain the center conductor in good electrical connection with flange 11.

This charge is then utilized as needed in the particular application. The ground path flows through the outer braid 13 of the coaxial cable, through structural portions 14 and 15 to the ground return ring 16. Outer braid 13 is connected to adapter 12 by hose clamps 29.

It will be noted that insulator 1A, structural portions 14 and 15, and ground return ring 16 form a cavity 17. This cavity 17 is filled with standard transformer insulating oil. Since the insulating oil is of much greater dielectric strength than air, it is clear that the distances between structural portions of the assembly can be minimized, consequently minimizing inductance. The insulating oil may be loaded into cavity 17 in either of two ways, i.e., through stand pipe 27 or after raising the ignitron assembly (made possible by removal of nut 31) and screw 25. Although the insulating oil is a great improvement over air, in order to maintain the voltage hold off in certain portions of the device, polyethylene cuffs have been utilized. For example, polyethylene cuffs 21 and 22 and wraps 18, 19, and 20 are provided to maintain the voltage hold off despite the very small distances between points of greatly varying potential.

A copper tube 23 provides the modest water cooling necessary for ignitrons operated at very high voltages, e.g., 0.1 gal./min. This tube is appropriately insulated and sealed against liquid leakage at 24 as they pass through the outer return. The ignitron lead 32 enters the assembly in like manner (not shown), while the charging of the capacitor may be accomplished by using one of the cooling tubes. Screws 25 maintain a tight fit between structural portions of the device. O-ring seal 26 prevents escape of the insulating oil from cavity 17. Stand pipe 27 provides an accurate determination of the amount of insulating oil present in cavity 17. Stand pipe 27 is provided with a flow path to cavity 17 through the adapter structure 28.

In prior designs, the anode potential had been taken off at the top of the ignitron. Since the ignitron did not contain a high dielectric medium material, the outer braid ground return had to be separated by a rather large distance from the point where the central conductor was connected to the anode lead. This large amount of skin-back resulted in large parasitic inductances. The term "skin-back" denotes the distance the braid is removed to provide insulation between the terminals of the conductors. The present design marks a distinct improvement over such an arrangement. The folded return concept permits the amount of skin-back to be greatly decreased (distance between flange 11 and outer braid 13) thereby contributing to the lowering of parasitic inductance. In addition, the present design permits a multitude of output cable connections (in the specific embodiment, twelve).

From the above it will be seen that the present device embodies several features, each of which mark a distinct advantage over prior designs.

(1) The use of insulating oil around the external central electrode.

(2) The diameter of the center electrode has been increased. For example, in prior designs this diameter had been of the order of ½ inch. In the specific embodiment of the present invention it is 2¼ inches.

(3) The spacing between the ground return and central electrode has been decreased. In prior designs this distance had been approximately 4½ inches, whereas it has now been decreased to ⅞ inch.

(4) The improvement of the ignitron housing to exclude objectionable parasitic inductance of the output cable.

Each of the above features serves to decrease the inductance of the capacitor and switch assembly. The prior capacitor-switch assemblies have been constructed in such a manner that they possessed intolerably large inductances, e.g., approximately 0.16 $\mu$h. The present design has an inductance of about 0.04 $\mu$h. thereby representing a four-fold improvement in inductance.

To one skilled in the art a consideration of the above disclosure and embodiment will make it clear that the invention is not limited to the specific device described.

What is claimed is:

1. A low inductance capacitor and ignitron assembly comprising a capacitor, a centrally-located electrode and a peripherally located ground ring at the top of said capacitor, the diameter of said electrode being greater than the distance between the electrode and the ground return ring, an ignitron mounted on said electrode, said electrode and at least a part of said ignitron being immersed in insulating oil.

2. The assembly of claim 1 wherein said ignitron is contained in an ignitron housing and means are provided to conduct a potential to the anode of said ignitron through the ignitron housing.

3. The assembly of claim 2 wherein a plurality of load cables connected to the ignitron housing is provided to minimize the amount of skin-back on the load cables.

References Cited by the Examiner

UNITED STATES PATENTS

| | | | |
|---|---|---|---|
| 1,982,825 | 12/1934 | Morrison | 313—42 |
| 2,317,222 | 4/1943 | Ronci | 313—42 |
| 2,528,033 | 10/1950 | Clark | 313—163 |
| 2,844,752 | 7/1958 | Hoover | 313—307 |

JAMES W. LAWRENCE, *Primary Examiner.*

V. LAFRANCHI, *Assistant Examiner.*